(12) United States Patent
Rakic et al.

(10) Patent No.: US 8,798,261 B2
(45) Date of Patent: Aug. 5, 2014

(54) DATA PROTECTION USING DISTRIBUTED SECURITY KEY

(75) Inventors: Milan Rakic, Oxie (SE); Rimpu Varshney, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 55 days.

(21) Appl. No.: 13/381,315

(22) PCT Filed: Mar. 21, 2011

(86) PCT No.: PCT/EP2011/001390
§ 371 (c)(1),
(2), (4) Date: Dec. 28, 2011

(87) PCT Pub. No.: WO2012/126483
PCT Pub. Date: Sep. 27, 2012

(65) Prior Publication Data
US 2012/0243678 A1    Sep. 27, 2012

(51) Int. Cl.
*H04K 1/00*    (2006.01)
(52) U.S. Cl.
USPC .......................................................... 380/28
(58) Field of Classification Search
USPC .......................................................... 380/28
See application file for complete search history.

(56) References Cited

U.S. PATENT DOCUMENTS

| | | | | |
|---|---|---|---|---|
| 5,008,936 A | * | 4/1991 | Hamilton et al. | 380/281 |
| 5,680,460 A | * | 10/1997 | Tomko et al. | 713/186 |
| 6,219,794 B1 | * | 4/2001 | Soutar et al. | 726/18 |
| 7,156,299 B1 | * | 1/2007 | Harris et al. | 235/379 |
| 7,240,345 B2 | * | 7/2007 | Sueyoshi et al. | 717/161 |
| 7,437,574 B2 | * | 10/2008 | Ronkka et al. | 713/194 |
| 7,478,248 B2 | * | 1/2009 | Ziv et al. | 713/193 |
| 7,689,836 B2 | * | 3/2010 | Nagase et al. | 713/189 |
| 2004/0190181 A1 | * | 9/2004 | Hikosaka et al. | 360/69 |
| 2005/0108540 A1 | * | 5/2005 | Kusnoto et al. | 713/176 |
| 2005/0287987 A1 | * | 12/2005 | Yamamoto | 455/410 |
| 2007/0165864 A1 | * | 7/2007 | Nagase et al. | 380/284 |
| 2007/0240226 A1 | * | 10/2007 | Song et al. | 726/27 |

FOREIGN PATENT DOCUMENTS

| | | |
|---|---|---|
| EP | 1273996 A2 | 1/2003 |
| EP | 1580642 A1 | 9/2005 |
| EP | 1950683 A1 | 7/2008 |
| EP | 2180419 A1 | 4/2010 |
| WO | 2004/097609 A1 | 11/2004 |

OTHER PUBLICATIONS

PCT/ISA/210—International Search Report for corresponding PCT/EP2011/001390 (mailed Jun. 6, 2011).

(Continued)

*Primary Examiner* — Teshome Hailu
(74) *Attorney, Agent, or Firm* — Edwards Wildman Palmer LLP; Peter F. Corless; Steven M. Jensen (57) ABSTRACT

For protecting data stored in an electronic device, an inner security key encrypting and decrypting data stored in the electronic device is encrypted with an outer security key. The outer security key is stored on an external memory to be coupled to the electronic device. The outer security key is generated from at least a unique identifier of the electronic device, a unique identifier of the external memory device, and a personal identification number. Additional constituents of the outer security key may be provided, e.g., an identifier of an auxiliary device to be coupled to the electronic device.

30 Claims, 6 Drawing Sheets

(56) References Cited

OTHER PUBLICATIONS

"TotalCare: Remote Security Tool/Anti-Theft/Spy App/Control Your Phone via SMS", Retrieved from the Internet: URL:http://forum.xda-developers.com/showthread.php?t=835603 (dated Nov. 10, 2010) (retrieved on May 19, 2011).

Wikipedia, "Key derivation function", (dated Dec. 25, 2008) (retrieved from the Internet Jul. 10, 2010) URL:http://en.wikipedia.org/w/index.pho?title=key_derivation_function&oldid=260028157.

* cited by examiner

DATA PROTECTION USING DISTRIBUTED SECURITY KEY

CROSS-REFERENCE TO RELATED APPLICATIONS

This application is the national phase application pursuant to 35 U.S.C. §371 of International Application No. PCT/EP2011/001390, filed Mar. 21, 2011. This application is hereby incorporated herein by reference in its entirety.

FIELD OF THE INVENTION

The present application relates to methods of protecting data and to corresponding devices.

BACKGROUND

Mobile devices, e.g., smartphones or tablet devices, are increasingly advancing into application areas so far dominated by conventional personal computers. Further, the advance of so called "cloud computing" phenomena and devices having support for the same is paving the way for new business models. In each case, appropriate security models are needed that can preserve the confidentiality of data, even if devices are lost or stolen.

More specifically, a mobile device has the capability of storing huge quantities of data, and various security mechanisms may be applied to protect the data. Here, one common practice is to encrypt the data using a security key which is then, in some way, stored in the mobile device. This is a security risk as both the data that is to be protected and the means for providing the protection are physically on the same device. Further, passphrases may be used, which are to be entered by a user for accessing the protected data. Such passphrases are typically selected by the user or automatically generated. However, even when using complex passphrases, vulnerabilities exist, and it may become difficult for the user to remember complex passphrases.

A further possibility is to use dedicated devices for generating encryption keys. For example, such devices may perform a secret algorithm on prime numbers, which may be combined with additional parameters and/or operations, to produce an output that is used as an encryption key for encrypting data. On a separate location, the same algorithm may be used to generate a key for decrypting the data. However such solutions typically involve considerable costs for the dedicated devices.

In view of the above, there is a need for efficient techniques for protecting data, which can be implemented at low cost.

SUMMARY

According to an embodiment of the invention, a method of protecting data stored in an electronic device, e.g., a mobile user equipment, is provided. According to the method, an outer security key is obtained. With the outer security key, an inner security key is encrypted. The inner security key has the purpose of encrypting and decrypting data stored in the electronic device. The encrypted inner security key is stored on an external memory device to be coupled to the electronic device. The outer security key is generated from a unique identifier of the electronic device, a unique identifier of the external memory device, and a personal identification number. In this way, a protected data and a part of the protection mechanism can be separated in a convenient manner.

According to an embodiment of the invention, a method of protecting data stored in an electronic device, e.g., a mobile user equipment, is provided. According to the method, an encrypted inner security key is obtained from an external memory device coupled to the electronic device, and the encrypted inner security key is decrypted with an outer security key. With the decrypted inner security key, data are encrypted, and the encrypted data are stored in a memory of the electronic device. The outer security key is generated from a unique identifier of the electronic device, a unique identifier of the external memory device, and a personal identification number. In this way, the data may be securely stored in the electronic device.

According to a further embodiment of the invention, a method of protecting data stored in an electronic device, e.g., a mobile user equipment, is provided. According to the method, an encrypted inner security key is obtained from an external memory device coupled to the electronic device, and the encrypted inner security key is decrypted with an outer security key. Further, encrypted data, which are encrypted with the inner security key, are obtained from a memory of the electronic device. The obtained data are decrypted with the decrypted inner security key. The outer security key is generated from a unique identifier of the electronic device, a unique identifier of the external memory device, and a personal identification number. In this way, the protected data may be retrieved from the electronic device.

According to an embodiment, the inner security key is determined, e.g., on the basis of any suitable encryption algorithm, and the inner security key is encrypted with the outer security key. The encrypted inner security key is then stored on the external memory device.

According to an embodiment, the unique identifier of the electronic device is exclusively accessible through a trusted source, e.g., a signed application.

According to an embodiment, the outer security key is further generated from a unique identifier of a subscriber identity module associated with the electronic device. The unique identifier of the subscriber identity module may be exclusively accessible through a trusted source, e.g., a signed application. According to an embodiment, the unique identifier is modifiable, e.g., by remote signaling to the electronic device, which may be used to deactivate the outer security key.

According to an embodiment, the outer security key is further generated from at least one additional constituent. The additional constituent may modifiable by remote control signaling. An example of such a modifiable additional constituent is an identifier of a subscriber identity module. Another example is information stored in a rewritable memory of the electronic device. The remote control signaling for modifying the additional constituent may be transmitted via radio signals to be received by the electronic device, e.g., mobile communication signals. According to an embodiment, the outer security key may be deactivated by remotely modifying the at least one additional constituent, e.g., in case of a security problem such as the electronic device being lost or stolen.

According to an embodiment, the at least one additional constituent is selected from the group consisting of a voice sample, a retina scan, a finger print, a credit card number, a credit card validation code, near-field communication information, image data, such as a picture of a user's face, and an identifier of an auxiliary device. The outer security key can be extended to comprise any desirable number of constituents. For this purpose, additional constituents from the above-mentioned list or any other suitable additional constituents may be used.

According to an embodiment, the external memory device is a memory card or a flash drive.

According to a further embodiment of the invention, an electronic device, e.g., a mobile user equipment, is provided. The electronic device comprises a memory, an interface, and a processor. The memory is configured to store encrypted data. The interface is configured to provide coupling to an external memory device. The processor is configured to obtain an encrypted inner security key from an external memory device coupled to the interface, to decrypt the inner security key with an outer security key, and to encrypt data to be stored in the memory and decrypt encrypted data obtained from the memory with the decrypted inner security key. The outer security key is generated from a unique identifier of the electronic device, a unique identifier of the external memory device, and a personal identification number.

According to an embodiment, the processor is further configured to encrypt the inner security key with the outer security key and to store the encrypted inner security key on the external memory device.

According to an embodiment, the electronic device additionally comprises a further interface, which is configured to provide coupling to a subscriber identity module. In this case, the outer security key may further be generated from a unique identifier of a subscriber identity module coupled to the further interface.

According to an embodiment, the electronic device additionally comprises an auxiliary interface, which is configured to provide coupling to an auxiliary device, e.g., a headset or the like. In this case, the outer security key may further be generated from an identifier of an auxiliary device coupled to the auxiliary interface or from data provided by the auxiliary device, e.g., a voice sample, a retina scan, a finger print, or image data, such as a picture of a user's face.

The electronic device may be configured to operate in accordance with the above-described methods according to embodiments of the invention.

According to a further embodiment of the invention, a system is provided which comprises an electronic device in accordance with the above-described embodiments and an external memory device storing the encrypted inner security key.

The foregoing and other features and advantages of embodiments of the invention will become further apparent from the following detailed description and the accompanying drawings.

BRIEF DESCRIPTION OF THE DRAWINGS

Embodiments of the present invention are illustrated by the accompanying figures, in which.

DETAILED DESCRIPTION

In the following, embodiments of the present invention will be described in more detail and with reference to the accompanying drawings. The described embodiments are merely exemplary and not to be construed as limiting the scope of the present invention. It should be noted that in the drawings the elements are not necessary to scale with each other but have been depicted in a manner which allows for conveying features of the illustrated embodiments to a person skilled in the art.

In the following detailed description, embodiments of the present invention are described which relate to a mobile user equipment, which may be in the form of a smartphone, a mobile phone, a mobile computer, a tablet device, a personal digital assistant, or the like. It is to be understood that details of the electronic circuitry and components provided in the mobile user equipment will depend on the detailed implementation of the mobile user equipment. Accordingly, the mobile user equipment may also include components which are not addressed in the following discussion.

Figure 1:
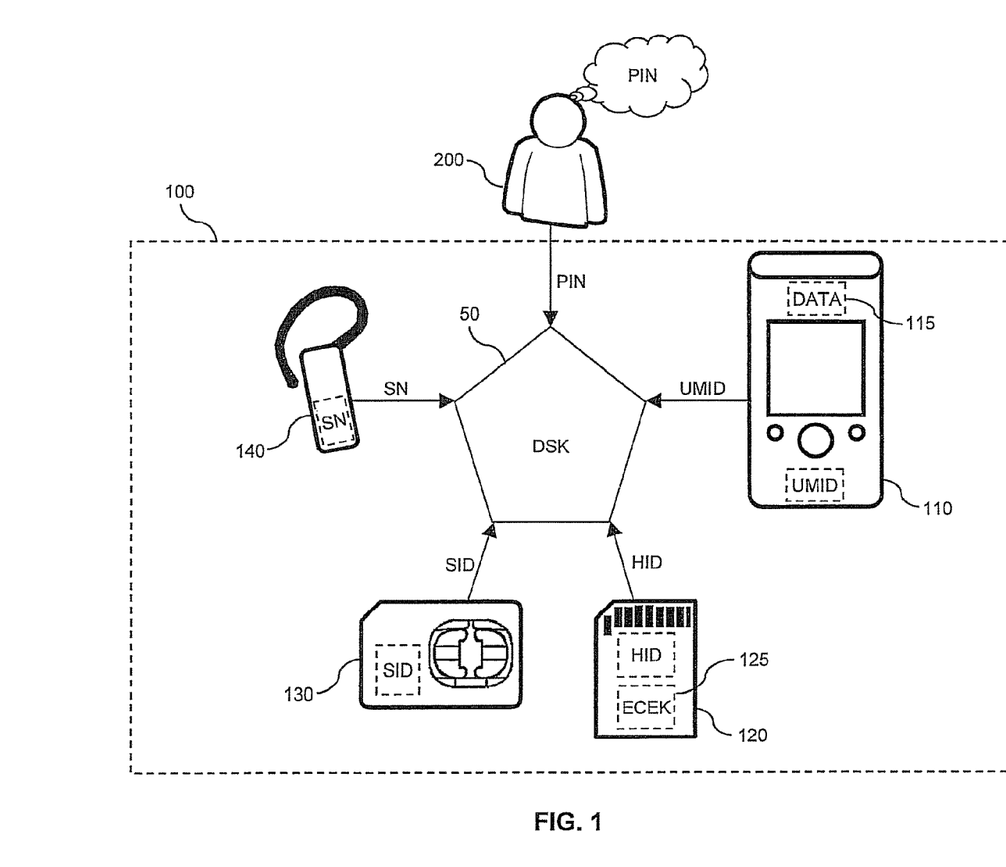
FIG. 1 schematically illustrates a system according to an embodiment of the invention.

FIG. 1 schematically illustrates a system 100 for protecting data in an electronic device in the form of a mobile user equipment 110. Further, FIG. 1 illustrates a user 200 of the mobile user equipment 110. As mentioned above, the mobile user equipment (110) may be a smartphone, a mobile phone, a tablet device, a mobile computer, a personal digital assistant, or the like. Besides the mobile user equipment 110, the system 100 further includes an external memory device 120. As further illustrated, the system 100 may also include a subscriber identity module (SIM) 130, e.g. a SIM card, and an auxiliary device 140. The external memory device 120 and, if provided, the SIM 130 and the auxiliary device 140 can be coupled to the mobile user equipment 110 via corresponding interfaces of the mobile user equipment 110. For example, the external memory device 120 could be coupled to the mobile user equipment 110 via a corresponding slot interface or USB (Universal Serial Bus) interface of the mobile user equipment 110. Similarly, the SIM 130 could be coupled to the mobile user equipment 110 via a corresponding SIM interface of the mobile user equipment 110, and the auxiliary device 140 could be coupled to the mobile user equipment 110 via a corresponding auxiliary interface of the mobile user equipment 110. The external memory device 120 may be implemented on the basis of flash semiconductor memory, e.g., in the form of a memory card or flash drive. However, it is to be understood that also other types of memory technology could be used in the external memory device 120, e.g., magnetic storage. In FIG. 1, the auxiliary device 140 is illustrated as a headset, which means that the auxiliary interface could be a Bluetooth interface. However, it is to be understood that other types of auxiliary devices could be used as well, e.g., a fingerprint scanner, a near field communication device, or the like, and that the implementation of the auxiliary interface may vary accordingly, e.g., may be a USB interface or even a proprietary data interface. Moreover, it is to be understood that a plurality of auxiliary devices could be coupled to the mobile user equipment 110.

According to embodiments as explained in the following, protection of data 115 stored the in the mobile user equipment 110 is implemented on the basis of an inner security key 125, which is used to encrypt and decrypt the data 115, and an outer security key 50, which is used to encrypt and decrypt the inner security key 125. As illustrated in FIG. 1, the inner security key 125 is stored, in encrypted form, in the external memory device 120. The outer security key 50 in turn is generated from various distributed constituents, of which a part are external constituents, i.e., constituents not stored in the mobile user equipment 110 or otherwise derivable from the mobile user equipment 110 itself. In particular, these constituents may be a unique identifier of the mobile user equipment 110, in the following referred to as UMID (Unique Mobile Identifier), a unique identifier of the external memory device 120, in the following referred to as HID (Hardware Identifier), and a PIN (Personal Identification Number) to be entered by the user 200. The UMID is typically assigned to the mobile user equipment 110 by its manufacturer and is stored therein in an unmodifiable manner, e.g., as part of firmware. Similarly, the HID is typically assigned to the external memory device 120 and is stored therein in an unmodifiable manner, e.g., as part of firmware. In accordance with the scenario of FIG. 1, the constituents may further include a unique identifier of the SIM 130, in the following referred to as SID (SIM identifier), and/or an identifier of the auxiliary device 140, e.g., a serial number (SN). The identifier of the auxiliary device 140 could also be a unique hardware identifier. The SID may be assigned to the SIM 130 by an issuer of the SIM 130, e.g., a network operator. As compared to the UMID and HID, the SID can be modified using appropriate control processes. In some embodiments as explained below, remote control signaling to the mobile user equipment 110 may be used to modify the SID.

The above-mentioned constituents, i.e., the UMID, the HID, the PIN, and optionally also the SID and/or the SN, are used as a generator of the outer security key 50. In the following, the outer security key 50 is also referred to as DSK (Distributed Security Key), the inner security key 125 is also referred to as CEK (Content Encryption Key), and the encrypted inner security key 125 is also referred to as ECEK (Encrypted CEK). Here, it is to be understood that the process of generating the DSK is not limited to the above-mentioned constituents, and can be expanded configured to include one or more additional constituents, e.g., a voice sample, a retina scan, a finger print, a credit card number, a card validation code, near field communication information, image data, such as a picture of a user's face, a serial number of one or more other auxiliary devices, and the like. In some embodiments, such additional constituents may also replace one or both of the above-mentioned optional constituents, i.e., the SID and the SN of the auxiliary device 140.

In accordance with the above explanations, generation of the DSK may be expressed by the following formula:

$$DSK = C1 \| C2 \| C3 \| \ldots \| CN, \quad (1)$$

wherein C1, C2, C3, CN denote the constituents and "$\|$" denotes a combination operation, such as a concatenation or more complex operations. In the above mentioned example, C1 would be the UMID, C2 would be the HID, C3 would be the PIN, C4 would be the SID, and C5 would be the SN.

In the following an exemplary algorithm for generation of the DSK is explained in more detail. According to this algorithm, from each constituent Ci a corresponding hash H is derived using an appropriate hash algorithm, e.g., the SHA1 (Secure Hash Algorithm 1) after which an intermediate secret key, ISK, is derived by extracting a first number of bits of the hash, e.g., the first 128 bits. Subsequently, the ISK's are fed to the algorithm sequentially until all ISK's are consumed. The process may be represented by the following pseudo-code:

```
DSK = null;
for (i = 1 to N)
{
  Hi = SHA1(Ci)
  ISKi = Trunc(Hi)
  DSK = HMAC (ISKi, STRING_IDi ⊖ DSK)
  i++
}
```

In the above pseudo code, ISKi is the intermediate secret key for the i-th constituent, N is the number of constituents, Trunc(X) denotes a truncation operation for extracting the first bits from the argument X, HMAC(Y,Z) denotes an operation for construction of a HMAC (Hash Based Message Authentication Code) on the basis of the arguments (Y,Z), STRING_IDi is a predefined random string value identifying the constituent, which preferably is known to the algorithm only, and ⊖ is a combination operation that would combine the values of STRING_ID and DSK, e.g., a concatenation operation. Typically, the appropriate number of bytes that would be needed for the successful usage of any of the values may be handled by the algorithm as well. However, this is not represented in the above pseudo-code.

Figure 2:
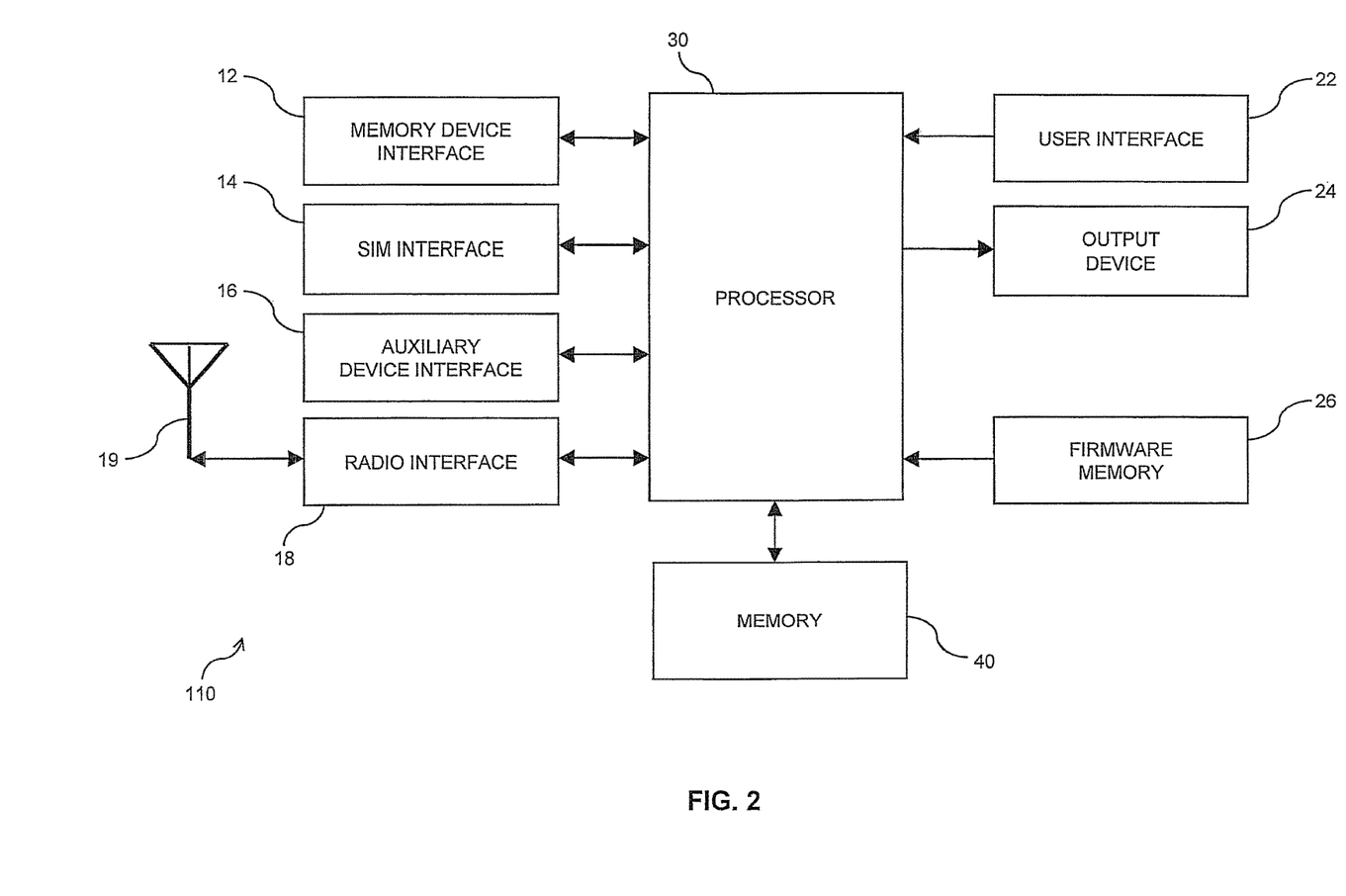
FIG. 2 schematically illustrates an electronic device according to an embodiment of the invention.

FIG. 2 schematically illustrates an implementation of the mobile user equipment 110. According to the illustrated implementation, the mobile user equipment 110 is provided with a processor 30, a memory device interface 12, a SIM interface 14, an auxiliary device interface 16, and a radio interface 18 with corresponding antenna 19. Further, the mobile user equipment 110 is provided with a user interface 22 and an output device 24. The mobile user equipment 110 further includes a firmware memory 26 and a memory 40 for storing data.

In the illustrated implementation, the memory device interface 12 may be used for coupling the mobile user equipment 110 to the external memory device 120, thereby allowing the processor 30 of the mobile user equipment 110 to read data from the external memory device 120 and typically also to write data to the external memory device 120. In the embodiments as described herein, the memory device interface may be used to read the ECEK from the external memory device 120 and optionally also to write the ECEK to the external memory device 120. The SIM interface may be used for coupling the mobile user equipment 110 to the SIM 130, thereby allowing the processor 30 of the mobile user equipment 110 to read data from the SIM 130 and typically also write data to the SIM 130. In the embodiments as described herein, the SIM interface 14 may be used to read the SID from the SIM 130 and optionally also to modify the SID of the SIM 130. The auxiliary device interface 16 may be used for coupling the mobile user equipment 110 to the auxiliary device 140, thereby allowing the processor 30 of the mobile user equipment 110 to receive data from the auxiliary device 140 and typically also to send data to the auxiliary device 140. In the embodiments as described herein, the auxiliary device interface 16 may be used to read the SN from the auxiliary device 140. The auxiliary device interface 16 may be implemented as a wire-based interface, such as a USB interface, or may be implemented as a wireless interface such as a Bluetooth interface or an infrared interface. The radio interface 18 may be used to receive and transmit radio signals, e.g., according to a mobile communication standard such as a 3GPP ($3^{rd}$ Generation Partnership Project) standard. In the embodiments as described herein, the radio interface 18 may be used for receiving remote control signaling to deactivate the DSK in case of a security problem, such as the mobile user equipment 110 being lost or stolen.

The user interface 22 has the purpose of allowing the processor 30 to receive inputs from a user, e.g., the user 200. For example, the user interface may be implemented as a keypad, as a touch-sensitive display, or as a combination thereof. In some embodiments, the user interface 22 could also support voice inputs from the user. In the embodiments as described herein, the user interface 22 may be used by the user 200 for inputting the PIN.

The output device 24 has the purpose of allowing the processor 30 to output information to a user of the mobile user equipment 110, e.g., to the user 200. For example, the output device 24 may be implemented as an optical display screen, as an acoustical output device, or as a combination thereof. In the embodiments as described herein, the output device 24 may be used for outputting decrypted data to the user 200 and/or for prompting the user 200 to perform certain operations, such as connecting the external memory device or entering the PIN.

The firmware memory 26, which may be a read-only memory or a flash memory, is used to store system information of the mobile user equipment 110 and typically also program code to be executed by the processor 30 during operation of the mobile user equipment 110. In the embodiments as described herein, the firmware memory 26 may store the UMID. According to some embodiments, the UMID may be derivable in a different manner from the mobile user equipment 110, e.g., may be generated during run-time by a secure hardware algorithm based on mathematical formulas, without explicitly storing the UMID. The UMID may also be stored in a dedicated secure storage of the mobile user equipment 110, e.g., in a read-only memory (ROM).

The memory 40, which may be implemented as a flash memory, has the purpose of storing various types of content on the mobile user equipment 110. The memory 40 may be accessed by the processor 30 in read operations and write operations. In the embodiments as described herein, the memory 40 may be used for storing encrypted data.

The processor 30, which may be any type of programmable microprocessor, has the purpose of controlling operations of the mobile user equipment 110. This may be accomplished by executing program code stored in the firmware memory 26, in the memory 40, and/or in any other storage, e.g., in a secure random-access memory (RAM). In the embodiments as described herein, the processor 30 may be used to obtain the ECEK from the external memory device, to obtain the constituents of the DSK, to generate the DSK from the constituents, to encrypt the CEK and/or decrypt the ECEK with the DSK, to encrypt data to be stored in the memory 40 with the decrypted CEK, and/or to decrypt encrypted data from the memory 40 with the decrypted CEK.

It is to be understood that the implementation of FIG. 2 is merely exemplary and that other implementations could be used as well.

In the following, an exemplary process of configuring the system 100 of FIG. 1 for protecting data will be explained in connection with FIG. 3, which shows a flow chart for illustrating a method of configuring the external storage device 120 with the encrypted inner security key 125. This process may be managed by a configuring authority, which may be the user 200 or a provider of the components of the system 100, e.g., a company or organization providing the user 200 with the system 100 such as an employer of the user 200. The configuring authority may configure the generation process of the DSK, e.g., determine which constituents should be used, and also provide the CEK. For example, the configuring authority may obtain the UMID of the mobile user equipment 110 and write data to a region on the SIM 130, such as an Elementary Files region, and perform operations on it, such as deriving a SHA1 hash value. This may serve the purpose to identify the mobile user equipment 110 and the SIM 130 as belonging to a company or organization and its network. Similar operations could be conducted on other devices, assigned to the user 200, that are involved in the generation process of the DSK. The configuring authority may further combine the constituents, e.g., the UMID, HID, PIN, SID, and SN to generate the DSK. The DSK may then be used by the configuring authority as a key to encrypt the CEK, thereby obtaining the ECEK. The configuring authority may then store the ECEK on the external memory device 120. The CEK itself may be based on any suitable encryption method. Further, any suitable encryption method may be used in order to encrypt the CEK with the DSK to derive the ECEK. In some embodiments, the configuring authority may customize the DSK by selecting the number and types of constituents of the DSK. For example, the SN may be replaced by another constituent and/or any desirable number of additional constituents may be added to the DSK.

Figure 3:
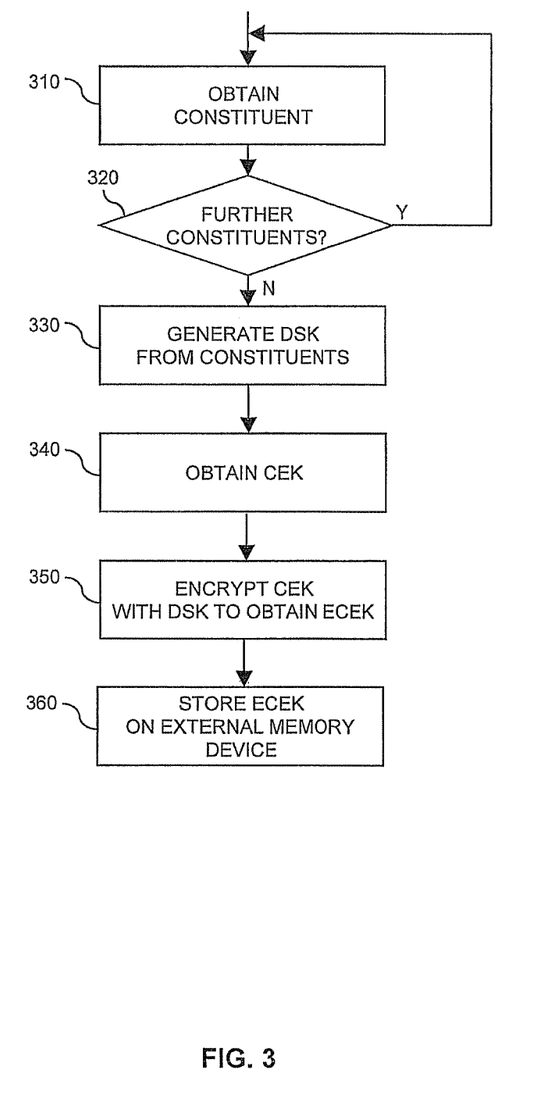
FIG. 3 shows a flow chart for schematically illustrating a method according to an embodiment of the invention.

In the method of FIG. 3, a constituent of the DSK is obtained at step 310. When implementing the method in the mobile user equipment 110, the processor 30 of the mobile user equipment may access appropriate sources for obtaining the constituent. For example, the UMID may be obtained from the firmware memory 26 of the mobile user equipment 110 or may be derived from the mobile user equipment 110 in a different manner, e.g., from a secure storage or from a secure hardware algorithm based on mathematical formulas. For this purpose, it is beneficial to configure the UMID to be accessible exclusively via a trusted source, e.g., a signed application executed by the processor 30. In this way, unauthorized usage of the UMID can be avoided. The HID may be obtained from the external memory device 120 via the memory device interface 12. For this purpose, it is beneficial to configure the HID to be accessible exclusively via a trusted source, e.g., a signed application executed by the processor 30. In this way, unauthorized usage of the HID can be avoided. The SID may be obtained from the SIM 130 via the SIM interface 14. For this purpose, it is beneficial to configure the SID to be accessible exclusively via a trusted source, e.g., a signed application executed by the processor 30. In this way, unauthorized usage of the SID can be avoided. The PIN may be obtained by prompting the user 200 via the output device 24 to enter the PIN via the user interface 22. If the PIN is not yet configured, the user 200 may be prompted to select a PIN and optionally also confirm the selected PIN, or the PIN may be automatically generated. The SN may be obtained from the auxiliary device 140 via the auxiliary device interface 16. Here, it is to be understood that also other constituents may be obtained via the auxiliary interface 16, e.g., a SN of another or an additional auxiliary device coupled to the auxiliary interface 16, e.g., a fingerprint scanner, and other types of constituent, e.g., a unique identifier of the auxiliary device, such as a unique hardware identifier. When implementing the method in some other device than the mobile user equipment 110, e.g., in a dedicated configuration device, the constituents may be obtained via corresponding sources and/or interfaces implemented in this other device.

At step 320, it is checked whether further constituents need to be obtained. If this is the case, as indicated by branch "Y" the method returns to step 310, to obtain the further constituent. If this is not the case, as indicated by branch "N", all constituents have been obtained and the method continues with step 330.

At step 330, the DSK is generated from the constituents, e.g., according to formula (1) or using the above-mentioned algorithm. As explained above, the DSK is generated at least from the unique identifier of the mobile user equipment 110, which in the illustrated example is the UMID, from the unique identifier of the external memory device 120, which in the illustrated example is the HID, and from the PIN. Optionally, the DSK may further be generated from one or more additional constituents, which in the illustrated example are the SID of the SIM 130 and the SN of the auxiliary device 140.

At step 340, the CEK is obtained. The CEK may be provided on the basis of any suitable encryption algorithm offering the desired degree of protection. Since it is sufficient to generate the CEK a single time during configuration of the system, sophisticated algorithms may be used without causing excessive complexity for subsequent encryption or decryption processes.

At step 350, the CEK is encrypted with the DSK to generate the ECEK. Generation of the ECEK by encrypting the CEK with the DSK may be expressed by the following formula:

$$ECEK=(CEK,DSK). \tag{2}$$

At step 360 the encrypted CEK, i.e., the ECEK, is stored on the external memory device 120. When implementing the method in the mobile user equipment 110, this may be accomplished via the memory device interface 12. When implementing the method in some other device than the mobile user equipment 110, e.g., in a dedicated configuration device, the ECEK may be stored via a corresponding memory device interface implemented in this other device.

Having configured the system 100 by storing the ECEK on the external memory device 120 and optionally also configuring other components of the system, e.g., the mobile user equipment 110 by configuring encryption and decryption processes in firmware, the SIM 130 by configuring parameters of encryption and decryption processes and/or authorization data, and/or the auxiliary device 140 by configuring authorization data, the system 100 may be used for protecting data by securely storing data on the mobile user equipment 110 and/or by retrieving protected data from the mobile user equipment 110. Corresponding methods will now be further explained with reference to FIGS. 4 and 5.

Figure 4:
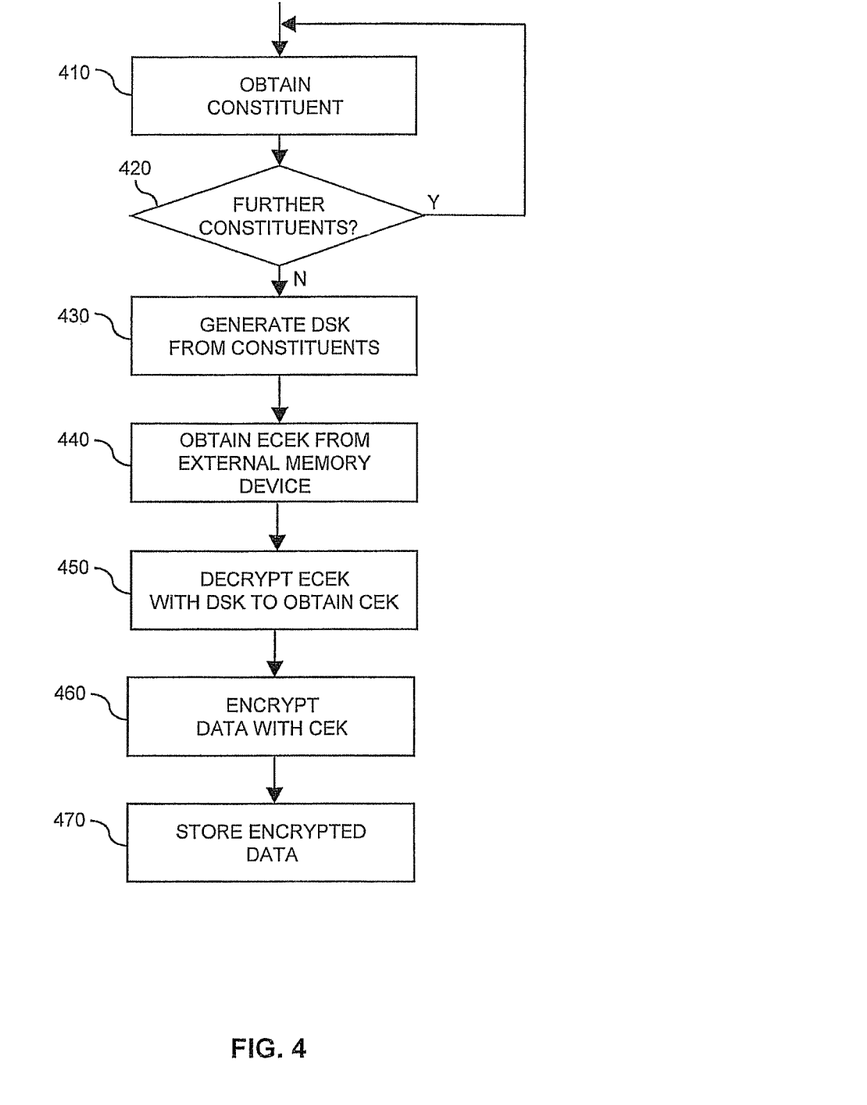
FIG. 4 shows a flow chart for schematically illustrating a further method according to an embodiment of the invention.

The flow chart of FIG. 4 illustrates a method of securely storing data in the mobile user equipment 110. The method is based on decrypting the ECEK as stored on the external memory device 120, thereby obtaining the CEK, which is accomplished with the DSK, and then using the CEK to encrypt data to be stored. When assuming an implementation of the mobile user equipment 110 as illustrated in FIG. 2, the steps of the method may be performed by the processor 30.

In the method of FIG. 4, a constituent of the DSK is obtained at step 410. When implementing the method in the mobile user equipment 110, the processor 30 of the mobile user equipment 110 may access appropriate sources for obtaining the constituent. For example, the UMID may be obtained from the firmware memory 26 of the mobile user equipment 110 or may be derived from the mobile user equipment 110 in a different manner, e.g., from a secure storage or from a secure hardware algorithm based on mathematical formulas. For this purpose, it is beneficial to access the UMID via a trusted source, e.g., a signed application executed by the processor 30. In this way, unauthorized usage of the UMID can be avoided. The HID may be obtained from the external memory device 120 via the memory device interface 12. For this purpose, it is beneficial to access the HID via a trusted source, e.g., a signed application executed by the processor 30. In this way, unauthorized usage of the HID can be avoided. The SID may be obtained from the SIM 130 via the SIM interface 14. For this purpose, it is beneficial to access the SID via a trusted source, e.g., a signed application executed by the processor 30. In this way, unauthorized usage of the SID can be avoided. The PIN may be obtained by prompting the user 200 via the output device 24 to enter the PIN via the user interface 22. The SN may be obtained from the auxiliary device 140 via the auxiliary device interface 16. Here, it should be noted that the number and types of constituents are not limited to the above-mentioned example. Rather, any number and types of constituents may be used, as configured in the method of FIG. 3.

At step 420, it is checked whether further constituents need to be obtained. If this is the case, as indicated by branch "Y" the method returns to step 410, to obtain the further constituent. If this is not the case, as indicated by branch "N", all constituents have been obtained and the method continues with step 430.

At step 430, the DSK is generated from the constituents, e.g., according to formula (1) or the above-mentioned algorithm. As explained above, the DSK is generated at least from the unique identifier of the mobile user equipment 110, which in the illustrated example is the UMID, from the unique identifier of the external memory device 120, which in the illustrated example is the HID, and from the PIN. Optionally, the DSK may further be generated from one or more additional constituents, which in the illustrated example are the SID of the SIM 130 and the SN of the auxiliary device 140.

As can be seen, generation of the DSK is only possible if all constituents can be obtained, which means that the correct mobile user equipment 110 needs to be used, the correct external memory device 120 needs to be coupled to the mobile user equipment 110, and the correct PIN needs to be entered. In the illustrated scenario, it is further necessary that the correct SIM 130 is coupled to the mobile user equipment 110 and the correct auxiliary device is coupled to the mobile user equipment 110. If it is not possible to obtain all constituents, a corresponding message to the user 200 may be generated, e.g., a failure message and/or a message prompting the user to perform operations needed to obtain a missing constituent, such as connecting the correct external memory device 120, inserting the correct SIM 130, or connecting the correct auxiliary device.

At step 440, the ECEK is obtained from the external memory device 120. In the implementation of the mobile user equipment 110 as illustrated in FIG. 2, the processor 30 may obtain the ECEK via the memory device interface 12.

At step 450, the ECEK is decrypted with the DSK to obtain the CEK. If the DSK is not correct, e.g., due to a false constituent, decryption is not possible and a corresponding message to the user 200 may be generated, e.g., a failure message.

At step 460, the data are encrypted with the CEK, and at step 470 the encrypted data are stored. In the implementation of the mobile user equipment 110 as illustrated in FIG. 2, the processor 30 may encrypt the data and store the encrypted data in the memory 40.

Figure 5:
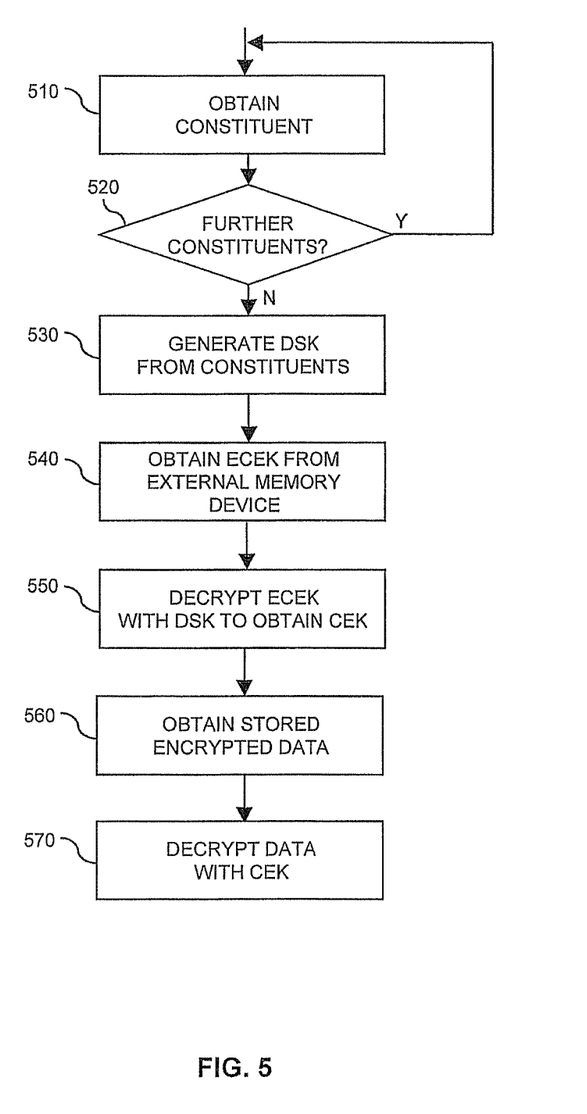
FIG. 5 shows a flow chart for schematically illustrating a still further method according to an embodiment of the invention.

The flow chart of FIG. 5 illustrates a method of retrieving protected data stored in the mobile user equipment 110. The method is based on decrypting the ECEK as stored on the external memory device 120, thereby obtaining the CEK, which is accomplished with the DSK, and then using the CEK to encrypt data stored in the mobile user equipment 110. When assuming an implementation of the mobile user equipment 110 as illustrated in FIG. 2, the steps of the method may be performed by the processor 30.

In the method of FIG. 5, a constituent of the DSK is obtained at step 510. When implementing the method in the mobile user equipment 110, the processor 30 of the mobile user equipment 110 may access appropriate sources for obtaining the constituent. For example, the UMID may be obtained from the firmware memory 26 of the mobile user equipment 110 or may be derived from the mobile user equipment 110 in a different manner, e.g., from a secure storage or from a secure hardware algorithm based on mathematical formulas. For this purpose, it is beneficial to access the UMID via a trusted source, e.g., a signed application executed by the processor 30. In this way, unauthorized usage of the UMID can be avoided. The HID may be obtained from the external memory device 120 via the memory device interface 12. For this purpose, it is beneficial to access the HID via a trusted source, e.g., a signed application executed by the processor 30. In this way, unauthorized usage of the HID can be avoided. The SID may be obtained from the SIM 130 via the SIM interface 14. For this purpose, it is beneficial to access the SID via a trusted source, e.g., a signed application executed by the processor 30. In this way, unauthorized usage of the SID can be avoided. The PIN may be obtained by prompting the user 200 via the output device 24 to enter the PIN via the user interface 22. The SN may be obtained from the auxiliary device 140 via the auxiliary device interface 16. Here, it should be noted that the number and types of constituents are not limited to the above-mentioned example. Rather, any number and types of constituents may be used, as configured in the method of FIG. 3.

At step 520, it is checked whether further constituents need to be obtained. If this is the case, as indicated by branch "Y" the method returns to step 510, to obtain the further constituent. If this is not the case, as indicated by branch "N", all constituents have been obtained and the method continues with step 530.

At step 530, the DSK is generated from the constituents, e.g., according to formula (1) or using the above-mentioned algorithm. As explained above, the DSK is generated at least from the unique identifier of the mobile user equipment 110, which in the illustrated example is the UMID, from the unique identifier of the external memory device 120, which in the illustrated example is the HID, and from the PIN. Optionally, the DSK may further be generated from one or more additional constituents, which in the illustrated example are the SID of the SIM 130 and the SN of the auxiliary device 140.

As can be seen, generation of the DSK is only possible if all constituents can be obtained, which means that the correct mobile user equipment 110 needs to be used, the correct external memory device 120 needs to be coupled to the mobile user equipment 110, and the correct PIN needs to be entered. In the illustrated scenario, it is further necessary that the correct SIM 130 is coupled to the mobile user equipment 110 and the correct auxiliary device is coupled to the mobile user equipment 110. If it is not possible to obtain all constituents, a corresponding message to the user 200 may be generated, e.g., a failure message and/or a message prompting the user to perform operations needed to obtain a missing constituent, such as connecting the correct external memory device 120, inserting the correct SIM 130, or connecting the correct auxiliary device.

At step 540, the ECEK is obtained from the external memory device 120. In the implementation of the mobile user equipment 110 as illustrated in FIG. 2, the processor 30 may obtain the ECEK via the memory device interface 12.

At step 550, the ECEK is decrypted with the DSK to obtain the CEK. If the DSK is not correct, e.g., due to a false constituent, decryption is not possible and a corresponding message to the user 200 may be generated, e.g., a failure message.

At step 560, encrypted data are obtained, and at step 570 the encrypted data are decrypted with the CEK. In the implementation of the mobile user equipment 110 as illustrated in FIG. 2, the processor 30 may obtain the encrypted data from the memory 40 and then decrypt the obtained data.

Figure 6:
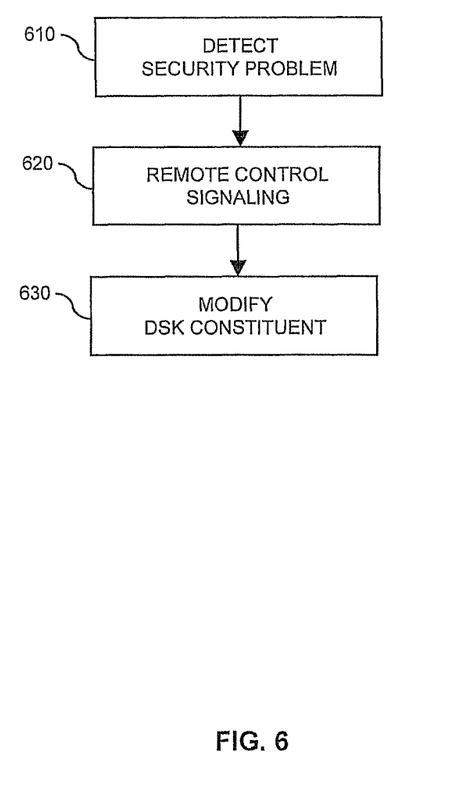
FIG. 6 shows a flow chart for schematically illustrating a still further method according to an embodiment of the invention.

FIG. 6 shows a flow chart for illustrating a further method which may be used for handling a security problem, e.g., the mobile user equipment 110 and other components of the system being lost or stolen. In this case, it is desirable to ensure that an unauthorized person is not able to access the protected data on the mobile user equipment 110. In this respect, the PIN, which is normally known to the authorized user 200 only, already provides some protection. Using the method of FIG. 6, the protection may be enhanced to address scenarios in which the protection by the PIN alone is not sufficient, e.g., if the PIN is in some way known to the unauthorized person. This is achieved by deactivating the DSK in response to detecting a security problem.

In the method of FIG. 6, the security problem is detected at step 610. For example, the user 200 may report that the mobile user equipment 110 and other components of the system 100 were lost or stolen. For example, this may be reported to the configuring authority or to an operator issuing the SIM 130 associated with the mobile user equipment 110.

At step 620, remote control signaling to the mobile user equipment 110 is performed, which has the purpose of modifying at least one of the constituents of the DSK. Here, it should be noted that some of the above-mentioned constituents of the DSK, e.g., the UMID, the HID, and the SN are typically not modifiable. As compared to that, the SID of the SIM 130 may be configured to be modifiable under strictly controlled conditions, e.g., when using predefined passphrases and a specific device for accessing the SIM 130, e.g., the mobile user equipment 110 associated with the SIM 130. That is to say, if the SIM 130 is coupled to the mobile user equipment 110 and the mobile user equipment 110 receives, via the radio interface 18, the remote control signaling, the processor 30 of the mobile user equipment 110 may perform appropriate operations to modify the SID, such as writing a new SID to the SIM using the SIM interface 14 of the mobile user equipment 110.

As a result of the remote control signaling of step 620, the constituent of the DSK is modified at step 630, which in turn changes the DSK. Due to the changed DSK, decryption of the ECEK stored on the external memory device is no longer possible, which means that the DSK is deactivated, and the encrypted data stored on the mobile user equipment 110 are efficiently protected against unauthorized access.

It should be noted that in the method of FIG. 6 also other constituents than the SID could be configured to be modifiable by remote control signaling. For example, such a modifiable constituent could be information stored in the memory 40 of the mobile user equipment 110 or information stored on the external memory device 120.

It is to be understood that the method steps of FIGS. 3, 4, 5, and 6 may be performed in any appropriate order, which may deviate from the order as illustrated. Also, it is to be understood that the methods of FIGS. 3, 4, 5, and 6 may be combined with each other, e.g., by using the method of FIG. 3 to store the ECEK on the external memory device, by using the method of FIG. 4 to store protected data in the mobile user equipment, by using the method of FIG. 5 for retrieving the protected data from the mobile user equipment, and optionally using the method of FIG. 6 for handling a security problem arising after storing the protected data in the mobile user equipment.

In the concepts as explained above, the data in the mobile user equipment 110 can be efficiently protected. In particular, the various constituents of the DSK offer a high degree of security. The UMID, which is a unique and typically not modifiable identifier of the mobile user equipment 110, ensures that no other device can be used to access the protected data. The HID, which is a unique and typically not modifiable identifier of the external memory device 120, ensures that only this particular external memory device 120 may be used for externally storing the ECEK. The SID, which is a unique identifier of the SIM 130, ensures that only the SIM 130 may be used when accessing the protected data. When using the mobile user equipment 110 with a different SIM, accessing the protected data is not possible. The PIN, which is an identifier that should be known only to the authorized user 200, ensures that only this user may access the protected data. Even when another person gets hold of the mobile user equipment 110 and the other components of the system 100, this other person will not know the PIN and cannot access the protected data. Further, through the optional addition of other unique and/or personally assignable constituents, such as the SN of the auxiliary device or other constituents as mentioned above, the protection performance of the DSK can be further improved and scaled as necessary. Adding further constituents also helps in mitigating the risk resulting from other constituents being compromised. Accordingly, different levels of security can be achieved based on the number of constituents of the DSK and their respective characteristics. Moreover, the concepts can be implemented at low cost, because the use of dedicated encryption and decryption hardware can be avoided.

It is to be understood that the embodiments and examples as described above have been provided for the purpose of illustrating the general concepts of the present invention and are susceptible to various modifications. For example, the concepts may be applied in various types of mobile user equipment and also in stationary electronic devices such as personal computers.

The invention claimed is:

1. A method of protecting data in an electronic device, the electronic device being a mobile user equipment, the method comprising:
   determining an inner security key for encrypting data to be stored in a flash memory of the electronic device, and decrypting the stored encrypted data;
   encrypting the inner security key with an outer security key; and
   storing the encrypted inner security key in an external memory device to be coupled with the electronic device,
   wherein said outer security key is generated from a unique identifier of the electronic device, a unique identifier of the external memory device, and a personal identification number (PIN) entered by a user and normally known only by the user.

2. The method according to claim 1, wherein the unique identifier of the electronic device is exclusively accessible through a trusted source.

3. The method according to claim 1, wherein outer security key is further generated from a unique identifier of a subscriber identity module associated with the electronic device.

4. The method according to claim 3, wherein the unique identifier of the subscriber identity module is exclusively accessible through a trusted source.

5. The method according to claim 1, wherein the outer security key is further generated from at least one additional constituent.

6. The method according to claim 5, wherein the at least one additional constituent is modifiable by remote control signalling.

7. The method according to claim 5, comprising:
   deactivating the outer security key by remotely modifying the at least one additional constituent.

8. The method according to claim 5, wherein the at least one additional constituent is selected from the group consisting of a voice sample, a retina scan, a finger print, a credit card number, a credit card validation code, near-field communication information, image data, and an identifier of an auxiliary device.

9. A method of protecting data in an electronic device, the electronic device being a mobile user equipment, the method comprising:
   obtaining an encrypted inner security key from an external memory device coupled to the electronic device;
   decrypting the inner security key with an outer security key;
   encrypting data to be stored in a flash memory of the electronic device with the decrypted inner security key; and
   storing the encrypted data in the flash memory of the electronic device,
   wherein said outer security key is generated from a unique identifier of the electronic device, a unique identifier of the external memory device, and a personal identification number (PIN) entered by a user and normally known only by the user.

10. The method according to claim 9, wherein the unique identifier of the electronic device is exclusively accessible through a trusted source.

11. The method according to claim 9, wherein outer security key is further generated from a unique identifier of a subscriber identity module associated with the electronic device.

12. The method according to claim 11, wherein the unique identifier of the subscriber identity module is exclusively accessible through a trusted source.

13. The method according to claim 9, wherein the outer security key is further generated from at least one additional constituent.

14. The method according to claim 13, wherein the at least one additional constituent is modifiable by remote control signalling.

15. The method according to claim 13, comprising:
    deactivating the outer security key by remotely modifying the at least one additional constituent.

16. The method according to claim 13, wherein the at least one additional constituent is selected from the group consisting of a voice sample, a retina scan, a finger print, a credit card number, a credit card validation code, near-field communication information, image data, and an identifier of an auxiliary device.

17. A method of protecting data in an electronic device, the electronic device being a mobile user equipment, the method comprising:
    obtaining an encrypted inner security key from an external memory device coupled to the electronic device;
    decrypting the inner security key with an outer security key;
    obtaining encrypted data from a flash memory of the electronic device, said encrypted data being encrypted with the inner security key; and
    decrypting the encrypted data with the decrypted inner security key,
    wherein said outer security key is generated from a unique identifier of the electronic device, a unique identifier of the external memory device, and a personal identification number (PIN) entered by a user and normally known only by the user.

18. The method according to claim 17, wherein the unique identifier of the electronic device is exclusively accessible through a trusted source.

19. The method according to claim 17, wherein outer security key is further generated from a unique identifier of a subscriber identity module associated with the electronic device.

20. The method according to claim 19, wherein the unique identifier of the subscriber identity module is exclusively accessible through a trusted source.

21. The method according to claim 17, wherein the outer security key is further generated from at least one additional constituent.

22. The method according to claim 21, wherein the at least one additional constituent is modifiable by remote control signalling.

23. The method according to claim 21, comprising:
deactivating the outer security key by remotely modifying the at least one additional constituent.

24. The method according to claim 21, wherein the at least one additional constituent is selected from the group consisting of a voice sample, a retina scan, a finger print, a credit card number, a credit card validation code, near-field communication information, image data, and an identifier of an auxiliary device.

25. An electronic device being a mobile user equipment, the electronic device comprising:
a flash memory configured to store encrypted data;
an interface configured to provide coupling to an external memory device; and
a processor configured to obtain an encrypted inner security key from an external memory device coupled to the interface, to decrypt the inner security key with an outer security key, and to encrypt data to be stored in the flash memory and decrypt encrypted data obtained from the flash memory with the decrypted inner security key;
wherein said outer security key is generated form a unique identifier of the electronic device, a unique identifier of the external memory device, and a personal identification number (PIN) entered by a user and normally known only by the user.

26. The electronic device according to claim 25, wherein the processor is further configured to encrypt the inner security key with the outer security key and to store the encrypted inner security key on the external memory device.

27. The electronic device according to claim 25, comprising:
a further interface configured to provide coupling to a subscriber identity module,
wherein outer security key is further generated from a unique identifier of a subscriber identity module coupled to the further interface.

28. The electronic device according to claim 25, comprising:
an auxiliary interface configured to provide coupling to an auxiliary device,
wherein the outer security key is further generated from an identifier of an auxiliary device coupled to the auxiliary interface.

29. A system, comprising:
an electronic device being a mobile user equipment, and
an external memory device storing the encrypted inner key,
wherein the electronic device comprises a flash memory configured to store encrypted data, an interface configured to provide coupling to the external memory device, and a processor configured to obtain an encrypted inner security key from the external memory device, to decrypt the inner security key with an outer security key, and to encrypt data to be stored in the flash memory and decrypt encrypted data obtained from the flash memory with the decrypted inner security key,
wherein said outer security key is generated from a unique identifier of the electronic device, a unique identifier of the external memory device, and a personal identification number (PIN) entered by a user and normally known only by the user.

30. The method according to claim 29, wherein the external memory device is a memory card or a flash drive.

* * * * *